United States Patent
Toyota et al.

[19]

[11] Patent Number: 5,884,525
[45] Date of Patent: Mar. 23, 1999

[54] GEAR TYPE POWER TRANSMISSION

[75] Inventors: Hideo Toyota, Hiroshima-ken; Osamu Kameda; Kenji Sakamoto, both of Hiroshima, all of Japan

[73] Assignee: Mazda Motor Corporation, Hiroshima-ken, Japan

[21] Appl. No.: 821,654

[22] Filed: Mar. 20, 1997

[30] Foreign Application Priority Data

Mar. 29, 1996 [JP] Japan .................................. 8-077742
Sep. 30, 1996 [JP] Japan .................................. 8-258414

[51] Int. Cl.$^6$ .................................................. F16H 37/00
[52] U.S. Cl. ................................. 74/325; 74/333; 74/359
[58] Field of Search ........................... 74/325, 331, 333, 74/359, 360

[56] References Cited

U.S. PATENT DOCUMENTS 5,014,567  5/1991  Horiuchi et al. .
5,105,674  4/1992  Rea et al. ............................ 74/359 X

FOREIGN PATENT DOCUMENTS

0 219 240  4/1987  European Pat. Off. .
2-134437  5/1990  Japan .

Primary Examiner—Khoi Q. Ta
Attorney, Agent, or Firm—Sixbey, Friedman, Leedom & Ferguson; Gerald J. Ferguson, Jr.; Donald R. Studebaker

[57] ABSTRACT

A manual power transmission includes a transmission casing, input and output shafts coaxially aligned with each other and a countershaft accommodated within the transmission casing and positioned below the input and output shafts. The input and output shaft has a plurality of gears of a varying size or diameter mounted thereon and associated with gearshifting positions and the countershaft has a corresponding number of coutergears of a varying size or diameter mounted thereon and paired with the gears on the input and output shafts. Some of the countergears which serve as an idle gear are so juxtaposed in a direction axially of the countershaft that an envelope enclosing all of the those countergears while touching respective outer perimeters of those remaining countergears represents a generally barrel shape having a generally intermediate portion thereof bulged radially outwardly with respect to the countershaft.

30 Claims, 5 Drawing Sheets

GEAR TYPE POWER TRANSMISSION

BACKGROUND OF THE INVENTION

1. Field of the Invention

The present invention generally relates to a power transmission and, more particularly, to a manual power transmission for varying the gear ratio between the automotive engine and drive wheels.

2. Description of the Prior Art

A manual power transmission though orthodox it may be nowadays has again gained popularity because of fun of car maneuverability. Of various manual power transmissions available, the power transmission is well known which comprises an input shaft drivingly coupled with the automotive engine, an output shaft drivingly coupled with the drive wheels and coaxially aligned with the input shaft, a countershaft or layshaft disposed parallel to those shafts, and a plurality of speed gear pairs including gears on the input and output shaft and associated countergears on the countershaft.

The power transmission of the structure described above is available in two types. One type is known as an input reduction gear type in which the drive of the input shaft is transmitted to the countershaft with the rotational speed (rpm) of the input shaft having been adjusted at a predetermined gear ratio determined by mutually meshed speed gears on the input shaft and the countershaft, respectively, and is in turn transmitted from the countershaft to the output shaft at another predetermined gear ratio which varies with the selected gearshift position. Briefly speaking, the input reduction gear type is characterized in that reduction in rotational speed takes place between the input shaft and the countershaft.

In this known input reduction gear type, since the speed gears are fixedly mounted on the input shaft and the countershaft, respectively, problems such as, for example, discussed below have been encountered.

(1) Since as a result of reduction in rotational speed a relatively high torque acts on the countershaft, the various gears employed and the input shaft and countershaft must have a high physical strength and a high rigidity such as, for example, by employing the gears of a relatively large face width and the input shaft and countershaft of an increased diameter. This hampers reduction in size and weight of the power transmission, making it difficult to provide a compact power transmission.

(2) When the automotive engine is driven while the automotive vehicle is held parked, that is, during an idle engine operating condition, all of the idler gears are driven idle relative to the countershaft and, therefore, gear clashing tends to occur considerably when rotation of the engine fluctuates.

(3) Since the countershaft is driven at a relatively high torque as a result of reduction in rotational speed accomplished by the speed gear pair and the torque exerted by the countershaft is subsequently increased depending on the gear ratio selected according to the gearshifting, the inertia acting on a gear change mechanism for each gearshift position including, for example, a speed synchronizer tends to become large, making it difficult to reduce the required gearshifting force.

A different type of the power transmission, known as an output reduction gear type, in which reduction in rotational speed takes place between the countershaft and the output shaft, appears to be an effective means for substantially solving the problems inherent in the input reduction gear type. An example of this output reduction gear type is disclosed in, for example, the published European Patent Application No. 0 219 240-A1, published Apr. 22, 1987. The output reduction gear type disclosed in this European publication comprises an input shaft, a countershaft, an output shaft, speed gears including forward drive gears on the input shaft and output shaft, countergears on the countershaft, and means for changing the gears through which power transmission is effected so as to change the transmission ratios. The speed gears on the input shaft are permanently in mesh with, and also in driving connection with, the countergears on the countershaft and are all mounted to rotate freely on the input shaft. Speed synchronizers are used to clutch the speed gears on the input shaft selectively to the input shaft.

In this known output reduction gear type, since the torque of the input shaft is transmitted to the countershaft without being increased, an input load acting on the various speed gears can be minimized. Also, since no fixed speed gear pair intervene between the input shaft and the countershaft, no associated speed synchronizer will be affected by the gear ratio represented by the speed gear pairs and, therefore, the inertia acting on the speed synchronizers is advantageously minimized.

In addition, according to the European publication referred to above, all of the speed synchronizers are disposed around the input shaft and, therefore, the all of the speed gears on the input shaft are rotatable independent of the input shaft, only the input shaft is driven during an engine idling condition, that is, when the power transmission is set to a neutral position with none of the gears on the input shaft being driven. This is effective to avoid clashing of the gears during the engine idling condition.

As discussed above, with the output reduction gear type, the problem inherent in the conventional input reduction gear type discussed earlier can advantageously be eliminated substantially. However, even the output reduction gear type has their own problems or some structural features that require improvement. By way of example, the output reduction gear type has problems associated with increase in rotational speed (rpm) of the countershaft which will now be discussed in detail.

In the case of the conventional input reduction gear type, the rotational speed of the countershaft is reduced according to the gear ratio of the speed gear pair intervening between the input shaft and the countershaft and such gear ratio is substantially fixed regardless of the gearshift position. In other words, the rotational speed of the countershaft is lower than the rotational speed (rpm) of the input shaft regardless of the gearshift position. However, in the case of the conventional output reduction gear type, the rotational speed of the countershaft is subject to variation according to the gear ratio of the gear pair selected according to the gearshift position and will, at a certain high-speed gearshift position or positions, attain a value higher than the rotational speed of the input shaft. Thus, for a given gear ratio, the rotational speed of the countershaft is considerably higher at a certain high-speed gearshift position or positions in the output reduction gear type than that in the input reduction gear type.

As discussed above, the output reduction gear type has the countershaft that tends to be driven at a higher speed than the input shaft. This feature appears to have brought about the following problems.

In the output reduction gear type, the rotational speed of the countershaft is determined by the product of the engine rotational speed times the gear ratio of a selected gear pair and, therefore, as compared with the rotational speed of the input shaft which varies solely with the engine rotational speed and regardless of the selected gear ratio, the range over which the rotational speed of the countershaft changes for all available gearshift positions is substantial. This involves, inter alia, a susceptibility of the countershaft to radial fluctuation as compared with the input shaft, with the consequence that a relatively large load may act on bearings supporting the countershaft.

On the other hand, the speed gears on the input shaft and countershaft are generally in the form of a helical gear and, accordingly, during power transmission from the input gear to the countershaft, a thrust force substantially proportional to the driving torque acts on the input shaft. Considering that the driving torque varies depending on the selected gear ratio, the thrust force acting on the input shaft correspondingly varies with the selected gear ratio, and this is particularly true in the output reduction gear type. This is in contrast to the input reduction type wherein the thrust force generated by the speed gears on the input shaft and countershaft is of a primary concern an the range of change in thrust force is relatively smaller than that in the output reduction gear type. Accordingly, where the lowest available gear ratio in the output reduction gear type is higher than that in the input reduction type, there is the possibility that for a given driving force, a given helical angle and a given tooth-to-tooth engagement between the speed gears on the input shaft and countershaft, the thrust force acting on the input shaft employed in the output reduction gear type is higher than that in the input speed gear.

Although this problem may be alleviated if relatively bulky and robust bearings are employed to increase the support rigidity, the use of the bulky bearings makes it difficult to provide a compact power transmission of the output reduction gear type.

However, the Japanese Laid-open Patent Publication No. 2-93151, published Apr. 3, 1990 (corresponding to U.S. Pat. No. 5,014,567, issued May 14, 1991) appears to have suggested a shaft support system in the output reduction gear type. According to this known shaft support system, ball bearings and roller bearings are employed according to positions where the input shaft and countershaft are to be supported. Specifically, for a given position where the input shaft and the countershaft are to be supported, bearings identical in type and size with each other are employed and, for this reason, it is clear that this known shaft support system has been devised with no regard paid to the difference in range of change of the rotational speed and, also, the difference in range of change of the thrust force.

There is another problem associated with the support of the countershaft. As discussed hereinbefore, the countershaft employed in the output reduction gear type tends to be driven at a higher speed than the input shaft. This involves another problem associated with the support of the countershaft. Considering that in the output reduction gear type the driving torque inputted from the input shaft is reduced according to a selected gear ratio accomplished by a selected speed gear on the input shaft and a mating speed gear on the countershaft, a relatively large torque tends to act on those speed gears giving the selected gear ratio to such an extent as to result in a tendency of the tooth-to-tooth engagement to vary. In the event that the speed gear pair giving the selected gear ratio displaces even the slightest distance in a radial or axial direction, clashing and/or friction sounds may be generated by the gears, accompanied by an eventually accelerated wear of the gears.

According to, for example, Proc. Insts. Mech. Engrs, 1974, Vol. 188 12/74 (pp 169–187), there is disclosed an output reduction gear type in which each of a main shaft, comprised of an input shaft and an output shaft, and a countershaft is rotatably supported at a portion adjacent an input end thereof and input and output ends of the speed gear pair. Specifically, the input end portion of the main shaft and the input end portion of the speed gear pairs are supported by a tapered roller bearing whereas the output end portion of the speed gear pair is rotatably supported by a roller bearing.

Although with the shaft support system disclosed in the literature referred to above the support rigidity can be appreciated to a certain extent since the opposite end portions of the speed gear pair are supported, it is a transmission gear which can be securely retained in position by the tapered roller bearing in an axial direction and the position of the speed gear pair in the axial direction cannot be retained sufficiently.

A further problem with the output reduction gear type is found when the speed synchronizers are disposed around the countershaft. More specifically, considering that in the output reduction gear type, the countershaft generally positioned below the input and output shafts, the countershaft is generally immersed in a quantity of lubricant oil accommodated within the transmission casing. This means that depending on the physical condition of the lubricant oil, the magnitude of a force necessary to accomplish gearshifting, that is, necessary for a driver to apply to a gearshift lever tends to vary. This will be discussed more in detail.

As hereinbefore discussed, the countershaft employed in the output reduction gear type is driven about its own longitudinal axis at a low rotational speed in a low speed drive, but at a high rotational speed in a high speed drive. Accordingly, the lubricant oil in which the countershaft is immersed receives a varying shearing force. The higher the rotational speed of the countershaft, the higher the shearing force acting on the countershaft, and vice versa. The shearing force acting on the lubricant oil does in turn bring about increase of the temperature of the lubricant oil, the gradient of which varies with the magnitude of the shearing force. In general the temperature of the lubricant oil is relatively high at the high speed drive, but relatively low at the low speed drive. The viscosity of the lubricant oil within the transmission casing which is affected by temperature is low at the highest speed gear position and high at the lowest speed gear position.

By the reason discussed above, mounting of the speed synchronizers around the countershaft in the output reduction gear type requires a relatively large gearshifting force at the low speed drive because of the lubricant oil exhibiting a low viscosity, but a relatively small gearshifting force at the high speed drive because of the lubricant oil exhibiting a high viscosity. Thus, with the known output reduction gear type in which the speed synchronizers are mounted around the countershaft, the gearshifting force necessary to accomplish a selected gear ratio varies considerably with position of the gearshift lever.

Furthermore, if in the output reduction gear type in which the rotational speed of the countershaft becomes considerably higher than that in the input reduction gear type as discussed above, all of the speed synchronizers are disposed around the input shaft such as suggested in the European publication referred to above, all of the gears on the input shaft must be the idler gears, that is, rotatable independent of the input shaft and, moreover, one of the gears of each of the firstspeed gear pair and the reverse-drive gear pair, both exhibiting a high gear ratio, which is smaller in gear size than the other, has to be an idler gear on the input shaft.

Accordingly, as will be discussed in detail later, at the high-speed gearshift position or positions, the respective idler gears of those gear pairs will be driven idle relative to the input shaft at a considerably high velocity which may lead to the possibility of associated bearings for those idler gears being undesirably seized. In particular, the idler gear forming a part of the reverse-drive gear pair, which is driven by a reverse idler gears in a direction counter to the direction in which any of the other idler gears on the input shaft is driven, the difference in rotational speed relative to the input shaft tends to increase considerably.

Although not specifically intended to tackle the problems inherent in the conventional output reduction gear type, the Japanese Laid-open Patent Publication No. 2-93151, published Apr. 3, 1990 (corresponding to U.S. Pat. No. 5,014, 567, issued May 14, 1991), for example, suggests another output reduction gear type in which the speed synchronizers except for the 3–4 speed synchronizer are disposed around the countershaft and also in which the reverse-drive gear pair is positioned closest to an input-side end wall of the transmission housing. According to this arrangement of the speed synchronizers, one of the gears of each of the first-speed gear pair and the reverse-drive gear pair, both exhibiting a high gear ratio, which is smaller in gear size than the other, is a fixed gear rotatable together with the input shaft and, therefore, the problem associated with the bearing seizure as discussed above can effectively be avoided.

As is well known to those skilled in the art, in the power transmission regardless of the type, supply of lubricant oil to respective meshing regions of the gears of the various gear pairs, the associated bearings for the idler speed gears and/or any other portions that require oiling is generally carried out by stirring the lubricant oil, accommodated in a bottom region of the transmission housing, upwardly by means of some of the countergears on the counter shaft then driven together with the latter. Most of the lubricant oil so stirred upwardly collides against the interior wall of the transmission casing and subsequently falls by gravity along the interior wall of the transmission casing and is cooled in contact with the interior wall of the transmission casing before it is again supplied to the meshing regions, bearings and/or portions that require oiling.

On the other hand, when the automotive vehicle is abruptly accelerated or decelerated or runs along the slope, the level of the lubricant oil accommodated in the transmission casing inclines relative to the transmission casing to such an extent that one of the countergears mounted adjacent an extremity of the countershaft will no longer be able to stir the lubricant oil upwardly, but the lubricant oil will be stirred up by some of the countergears mounted on a generally intermediate portion of the countershaft. In such case, if such some of the countergears on the generally intermediate portion of the countershaft have a relatively small diameter, the amount of the lubricant oil stirred up will become short of the requirement and all necessary portions where require oiling will not be oiled sufficiently.

Considering that in the case of the output reduction gear type, the rotational speed of the countershaft at a certain high-speed gearshift position or positions attains a value higher than the rotational speed of the input shaft as hereinbefore discussed, the gear layout in which the lubricant oil can be stirred up by some of the countergears during the rotation of the countershaft brings about such a problem that the resistance of stirring of the lubricant oil tends to be increased with increase in rotational speed of the countershaft, accompanied by a considerable increase in temperature of the lubricant oil as compared with that in the input reduction gear type to eventually result in difficulty in maintaining a favorable lubrication.

This problem may be substantially eliminated if the amount of the lubricant oil within the transmission casing is reduced to lower the oil level at the bottom of the transmission casing to thereby reduce the stirring resistance, but the lowering of the oil level does in turn bring a different, but detrimental problem in that the amount of the lubricant oil stirred up by some of the countergears during the rotation of the countershaft tends to become short of the requirement. These problems are considerably pronounced in the prior art output reduction gear type such as disclosed in the US patent referred to above since the reverse-drive gear pair including a reverse-drive countergear of a radial size larger than any other countergears is positioned closest to the input-side end wall of the transmission housing.

SUMMARY OF THE INVENTION

In view of the foregoing, the present invention is intended to provide an improved power transmission of the output reduction gear type which is so designed as to secure a satisfactory lubrication of the component parts of the power transmission even when the surface level of the lubricant oil within the transmission casing is inclined.

Another object of the present invention is to provide an improved power transmission of the type referred to above, wherein the support rigidity is increased to rotatably support the input shaft and the countershaft against radial and axial loads which would be imposed thereon.

A further object of the present invention is to provide an improved power transmission of the type referred to above, wherein one of the gear pairs which is susceptible to a relatively large torque is firmly supported against radial and axial loads to thereby eliminate any possible gear clashing and to increase the lifetime of the power transmission.

A still further object of the present invention is to provide an improved power transmission of the type referred to above, wherein any change of the force required to accomplish a gearshifting is substantially eliminated by changing the synchronizing capacitor at a predetermined gearshift position.

To this end, the present invention provides a power transmission having a plurality of gear ratios, which comprises a transmission casing having input and output end walls opposite to each other and also having an oil reservoir defined at bottom thereof; an input shaft having first and second ends opposite to each other and rotatably supported by the input end wall of the casing with the first and second ends thereof positioned inside and outside of the casing, respectively; an output shaft having first and second ends opposite to each other and rotatably supported by the output end wall of the casing with the first and second ends thereof positioned inside and outside of the casing and in coaxial relation with the input shaft; a countershaft having first and second ends opposite to each other an disposed within the casing and below the input and output shaft so as to extend parallel to any one of the input and output shafts.

A plurality of speed gear pairs associated respectively with the gear ratios include speed gears on the input and output shafts, at least one of which is mounted on the output shaft for rotation together therewith, the remaining speed gears being mounted on the input shaft and serving as an idle gear rotatable independent thereof, and countershaft gears on the countershaft, at least one of which is mounted on the countershaft for rotation together therewith and meshed with said at least one of the speed gears, the remaining countershaft gears serving as an idle gear rotatable independent thereof, said at least one of the countershaft gears being meshed with said at least one of the speed gears, and the speed gears and the countershaft gears are paired with each other to define the respective speed gear pairs associated respectively with gearshift positions.

A gear change mechanism is employed for changing a path of transmission of a drive from the input shaft to the output shaft directly or through the countershaft by way of a selected one of the gear pairs, and includes a plurality of speed synchronizers each operable to drivingly couple a selected one of the neighboring idle gears, positioned on respective sides thereof, with one of the input and output shafts and countershaft which carries such neighboring idle gears to allow the selected idle gear to rotate together with said one of the input and output shafts and countershaft. One of the speed synchronizers that is disposed on the path of transmission of the drive of the input shaft directly to the output shaft is disposed around the input shaft while the remaining speed synchronizers are disposed around the countershaft. The remaining countershaft gears has a size or diameter different from each other and being so juxtaposed on the countershaft in a direction axially of the countershaft that an envelope enclosing all of the remaining countershaft gears while touching respective outer perimeters of those remaining countershaft gears represents a generally barrel shape having a generally intermediate portion thereof bulged radially outwardly with respect to the countershaft.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

Figure 1:
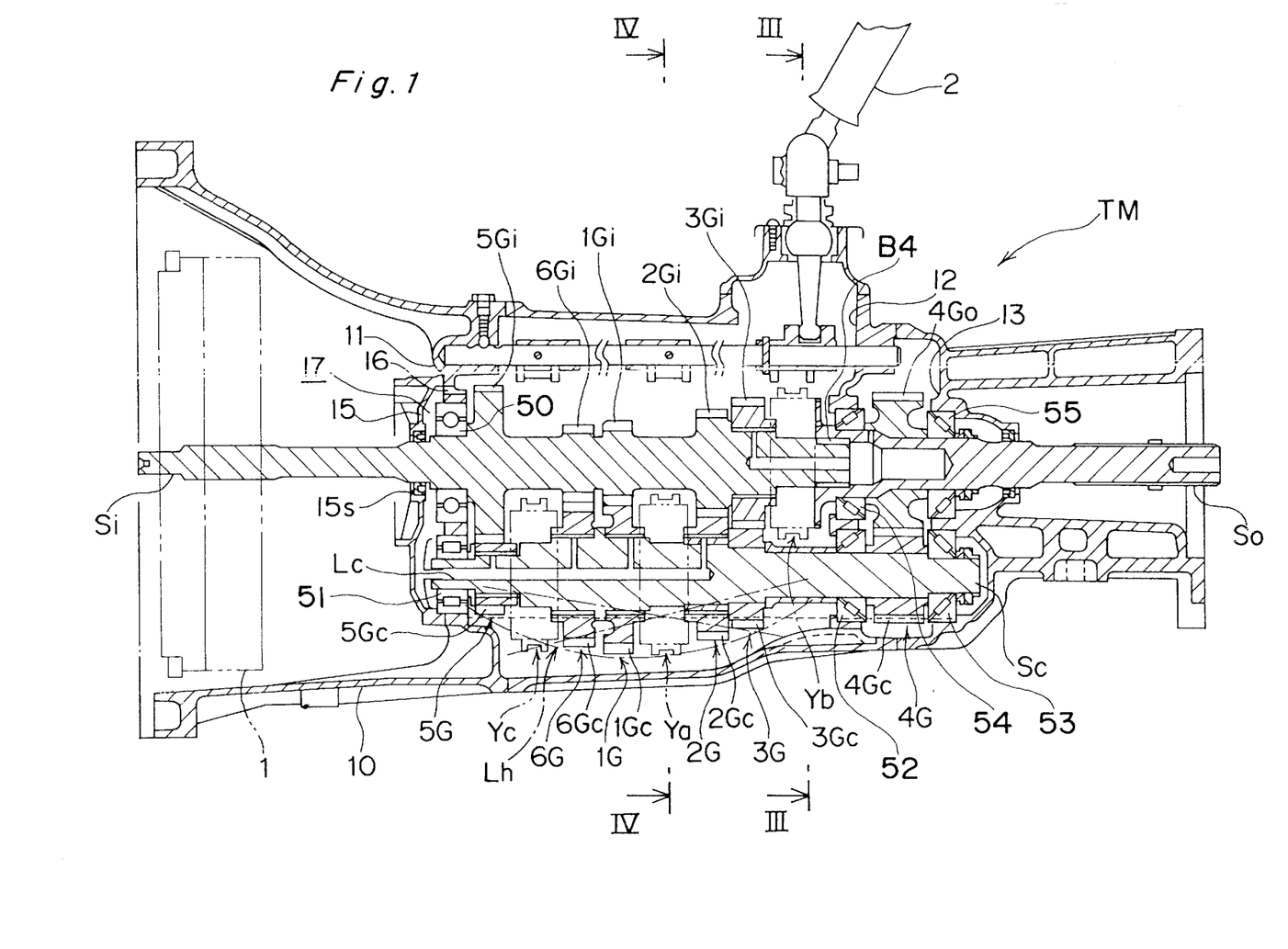
FIG. 1 is a longitudinal sectional view of a power transmission according to a first preferred embodiment of the present invention.

With particular reference to FIG. 1, an overview of an automotive manual power transmission TM embodying the present invention will first be given. The power transmission TM shown in a schematic longitudinal sectional representation therein includes a transmission casing 10 housing therein an input or main shaft Si adapted to be drivingly coupled with the engine crankshaft (not shown) through a clutch 1 and extending in a direction parallel to the longitudinal sense of the power transmission TM, and an output shaft So coaxially coupled at an input end with the input shaft Si for rotation independently of the input shaft Si and at the opposite, output end with a propeller shaft (not shown) which is in turn drivingly coupled with, for example, a rear wheel axle (not shown) through a differential gear unit (not shown). It is to be noted that the direct coupling between the input and output shafts Si and So is accomplished by inserting an output end of the input shaft So into a axial socket defined in the input end of the output shaft So with a needle bearing B4 intervening therebetween.

The transmission casing 10 also houses therein a countershaft or layshaft Sc extending parallel to the input and output shafts Si and So and positioned in part below the input shaft Si and in part below the output shaft So, and a plurality of, for example, first to sixth, speed gear pairs 1G to 6G. The first to third, fifth and sixth speed gear pairs 1G, 2G, 3G, 5G and 6G correspond respectively with the 1st-speed to 3rd-speed, 5th-speed and reverse-drive gearshift positions available in the power transmission TM whereas the 4th-speed drive is established by a direct coupling between the input and output shafts Si and So.

In the illustrated embodiment, the power transmission TM is of a five speed type with a reverse-drive capability and does therefore have six gearshift positions in total; 1st-speed, 2nd-speed, 3rd-speed, 4th-speed, 5th-speed and reverse-drive gearshift positions. Accordingly, the speed gear pairs 1G to 3G, 5G and 6G within the transmission casing 10 are associated with the 1st-speed, 2nd-speed, 3rd-speed, 5th-speed and reverse-drive gearshift positions, respectively, and the fourth speed gear pair 4G is associated with a drive transmission between the input and output shafts Si and So.

The first speed gear pair 1G is comprised of a 1st-speed gear 1Gi mounted on the input shaft Si for rotation together therewith and a 1st-speed countergear 1Gc mounted on the countershaft Sc for rotation independently thereof and meshed with the 1st-speed gear 1Gi; the second speed gear pair 2G is comprised of a 2nd-speed gear 2Gi mounted on the input shaft Si for rotation together therewith and a 2nd-speed countergear 2Gc mounted on the countershaft Sc for rotation independently thereof and meshed with the 2nd-speed gear 2Gi; the third speed gear pair 3G is comprised of a 3rd-speed gear 3Gi mounted on the input shaft Si for rotation independently thereof and a 3rd-speed countergear 3Gc mounted on the countershaft Sc for rotation together therewith and meshed with the 3rd-speed gear 3Gi; the fourth speed gear pair 4G is comprised of an output gear 4Go mounted on the output shaft So for rotation together therewith and an output countergear 4Gc mounted on the countershaft Sc for rotation together therewith and meshed with the output gear 4Go; the fifth speed gear pair 5G is comprised of a 5th-speed gear 5Gi mounted on the input shaft Si for rotation together therewith and a 5th-speed countergear 5Gc: mounted on the countershaft Sc for rotation together therewith and meshed with the 5th-speed gear 5Gi; and the reverse-drive speed gear pair 6G is comprised of a reverse-drive gear 6Gi mounted on the input shaft Si for rotation together therewith and a reverse-drive countergear 6Gc mounted on the countershaft Sc for rotation independently thereof and meshed with the reverse-drive gear 6Gi through an idler gear (not shown) in a manner well known to those skilled in the art.

The illustrated power transmission TM is of a so-called output reduction gear type in which as will be described in detail later the output gear 4Go and the output countergear 4Gc forming the fourth speed gear pair 4G are drivingly coupled direct with each other at all times so that when a gearshift lever 2 is set to any one of the 1st-speed, 2nd-speed, 3rd-speed, 5th-speed and reverse-drive gearshift positions the rotation of the countershaft Sc can be transmitted to the output shaft So at a speed determined by a selected gear ratio between the corresponding gear on the input shaft Si and the associated countergear on the countershaft Sc. It is, however, to be noted that when the gearshift lever 2 is set to the 4th-speed gearshift position, the input shaft Si is directly coupled with the output shaft So for driving the output shaft So in synchronism with the input shaft Si in a manner as will become clear from subsequent description and rotation of the output shaft So is also transmitted to the countershaft Sc through the fourth speed gear pair 4G to drive the countershaft Sc idle about its own longitudinal axis. Thus, the 4th-speed gearshift position is a direct-coupling stage in which the input and output shafts Si and So are coupled direct with each other. This fourth speed gear pair 4G is preferably positioned adjacent an output end of the countershaft Sc and the input end of the output shaft So.

The transmission casing 10 has a plurality of, for example, three, bulkheads 11, 12 and 13 formed integrally therewith so as to extend radially inwardly from an inner wall surface thereof and spaced from each other in a direction conforming to the longitudinal sense of the power transmission TM. The input-side, intermediate and output-side bulkheads 11 to 13 carries various bearings for the rotatable support of the input shaft Si, the output shaft So and the countershaft Sc. Two of the various bearings which are carried by the input-side bulkhead 11 for the support of the input shaft Si and the countershaft Sc, indicated by 50 and 51, respectively, are covered by a front cover 15 secured exteriorly to the input-side bulkhead 11.

Specifically, an input end portion of the input shaft Si adjacent the 5th-speed gear 5Gi and remote from the output shaft So is rotatably supported by the bearing 50 that is carried by the input-side bulkhead 11 whereas an input end of the countershaft Sc adjacent the 5th-speed countergear 5Gc is rotatably supported by the bearing 51 that is also carried by the input-side bulkhead 11. Preferably, the bearings 50 and 51 are of a type different from each other. In the illustrated embodiment, the bearing 50 is in the form of a ball bearing and the bearing 51 is in the form of a roller bearing. The other bearings include those mounted around an output end of the countershaft Sc and on respective input and output sides of the output countergear 4Gc as indicated by 52 and 53, respectively, and those mounted around an input end of the output shaft So and on respective input and output sides of the output gear 4Go as indicated by 54 and 55, respectively.

Although each of the bearings 52 to 55 may be of any known type such as, for example, a ball bearing or a roller bearing or a combination thereof, a tapered-roller bearing may be conveniently employed for all of those bearings 52 to 55 to permit the respective bearing 52 to 55 to withstand possible radial and thrust loads. As is well known to those skilled in the art, the tapered-roller bearing comprises inner and outer races and a plurality of cylindrical rollers operatively interposed between the inner and outer races and having their own longitudinal axes inclined so as to flare outwardly. In the illustrated embodiment, the tapered-roller bearings 52 and 53 positioned on the input and output sides of the output countergear 4Gc are mounted around the countershaft Sc with their rollers flared towards the output countergear 4Gc and, similarly, the tapered-roller bearings 54 and 55 positioned on the input and output sides of the output gear 4Go are mounted around the output shaft Sc with their rollers flared towards the output gear 4Go.

Thus, it will readily be understood that the output gear 4Go and the output countergear 4Gc forming the fourth speed gear pair 4G which are susceptible to a relatively large torque can be firmly and robustly supported and positioned so as to counteract the radial and axial loads to thereby minimize the gear clashing and any possible biased wear of one or both of those gears 4Go and 4Gc.

The gear layout, that is, the manner in which the speed gear pairs 1G to 6G are disposed, according to the present invention will now be described. For this purpose, a combination of the fifth speed gear pair 5G and the sixth speed gear pair 6G, a combination of the first speed gear pair 1G and the second speed gear pair 2G and a combination of the third speed gear pair 3G and the fourth speed gear pair 4G are referred to as a 5-R speed gear unit, a 1–2 speed gear unit and a 3–4 speed gear unit, respectively.

Of those speed gear units, the 5-R speed gear unit and the 3–4 speed gear unit are disposed on the input and output sides of the power transmission TM, respectively, whereas the 1–2 speed gear unit is disposed generally intermediate between the 5-R and 3–4 speed gear units. In addition, in each of those speed gear units, the sixth speed gear pair 6G, the second speed gear pair 2G or the fourth speed gear pair 4G are disposed on an output side of the fifth speed gear pair 5G, the first speed gear pair 1G or the third speed gear pair 3G, respectively. Thus, it will readily be seen that the power transmission TM embodying the present invention employs such a gear layout that, from the input side to the output side of the power transmission TM, the fifth speed gear pair 5G is followed by the sixth speed gear pair 6G followed by the first speed gear pair 1G followed by the second speed gear pair 2G followed by the third speed gear pair 3G followed by the fourth speed gear pair 4G.

As hereinbefore described, the power transmission TM embodying the present invention is of the output reduction gear type in which the output gear 4Go and the output countergear 4Gc forming the fourth speed gear pair 4G are drivingly coupled direct with each other with the output gear 4Go rotatable relative to the input shaft Si. With this output reduction gear type, the countershaft Sc although driven idle about its own longitudinal axis when the gearshift lever 2 is set to the 4th-speed gearshift position with the input and output shafts Si and So consequently coupled direct with each other will not be driven idle when the gearshift lever 2 is set to a neutral position such as effected during an engine idling condition.

The 1–2 speed gear unit includes a 1–2 speed synchronizer Ya disposed around the countershaft Sc and between the 1st-speed countergear 1Gc and the 2nd-speed countergear 2Gc for establishing a drive transmission path selectively between the 1st-speed countergear 1Gc and the countershaft Sc or between the second-speed countergear 2Gc and the countershaft Sc; the 3–4 speed gear unit includes a 3–4 speed synchronizer Yb mounted around the input shaft Si adjacent the output shaft So for establishing a drive transmission path selectively between the 3rd-speed 3Gi and the input shaft Si or between the input shaft Si and the output shaft So; and the 5-R speed gear unit includes a 5-R speed synchronizer Yc disposed around the countershaft Sc and between the 5th-speed countergear 5Gc and the reverse-drive countergear 6Gc for establishing a drive transmission path selectively between the 5th-speed countergear 5Gc and the countershaft Sc or between the reverse-drive countergear 6Gc and the countershaft Sc. While both of the 1–2 and 5-R speed synchronizers Ya and Yc are disposed around the countershaft Sc because the countergears 1Gc and 2Gc, 5Gc and 6Gc associated respectively therewith are an idle gear rotatably independent of the shaft on which it is mounted, the 3–4 speed synchronizer Yb is disposed around the input shaft Si because an input gear of the 3–4 speed gear unit, that is, the 3rd-speed gear 3Gi is an idle gear rotatable independent of the shaft on which it is mounted.

The speed synchronizers Ya to Yc are of a substantially identical construction and, therefore, only one of them, for example, the 5-R speed synchronizer Yc, will now be discussed with particular reference to FIG. 2.

Figure 2:
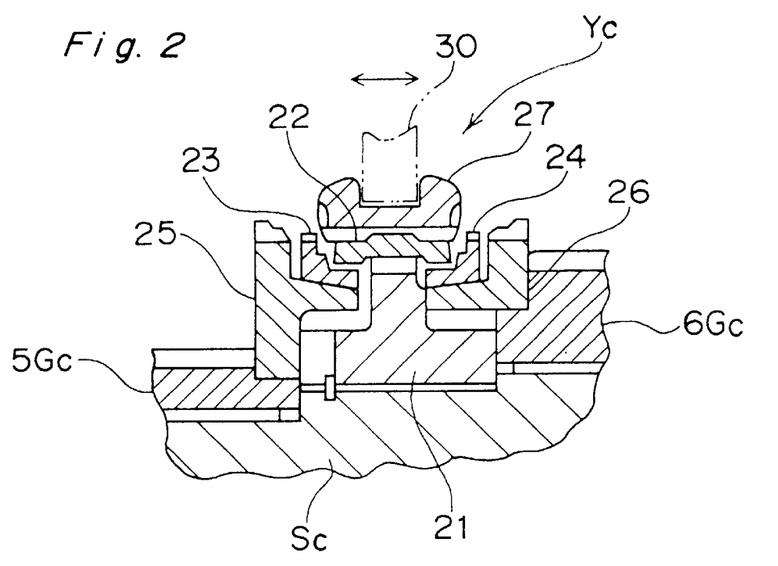
FIG. 2 is a fragmentary longitudinal sectional view showing one of speed synchronizers employed in the power transmission.

Referring to FIG. 2, the 5-R speed synchronizer Yc shown therein is of a so-called "single-cone type" and includes a synchronizer hub 21 splined to the countershaft Sc (the input shaft Si in the case of the speed synchronizer Yb), a plurality of spaced synchronizer keys 22 mounted on an outer peripheral surface of the synchronizer hub 21, front and rear synchronizer rings or cones 23 and 24 positioned on respective sides of the synchronizer hub 21, front and rear gear-mounted mating rings or cones 25 and 26 positioned generally in face-to-face relation with the respective front and rear synchronizer cones 23 and 24, and a synchronizer sleeve 27 mounted around the synchronizer hub 21 and slidable in one of the opposite directions counter to each other in a direction axially of the countershaft Sc in response to movement of a shifter fork 30 linked with the gearshift lever 2.

Thus, each speed synchronizer is so designed and so configured that depending on the direction in which the synchronizer sleeve of the respective speed synchronizer is moved according to the gearshifting, one of the gears on respective sides of the speed synchronizer can be locked to and driven together with the shaft on which those gears are mounted. Referring now to the illustrated embodiment, more specifically, the 1–2 speed synchronizer Ya is operable to selectively lock one of the 1st-speed and 2nd-speed countergears 1Gc and 2Gc to the countershaft Sc when the gearshift lever 2 is moved to the 1st-speed or 2nd-speed gearshift position, respectively; the 3–4 speed synchronizer Yb is operable to selectively lock one of the 3rd-speed 3Gi and the input shaft Si to the input shaft Si or the output shaft So when the gearshift lever 2 is moved to the 3rd-speed or 4th-speed gearshift position, respectively; and the 5-R speed synchronizer Yc operable to selectively lock one of the 5th-speed and reverse-drive countergears 5Gc and 6Gc to the countershaft Sc when the gearshift lever 2 is moved to the 5th-speed or reverse-drive gearshift position, respectively.

In any event, the speed synchronizers employed in the practice of the present invention are of any construction well known to those skilled in the art such as disclosed in, for example, the published European Patent Application No. 219,240-A1 or U.S. Pat. No. 5,014,567, reference to which are herein incorporated by reference, and no further detail thereof will be herein reiterated for the sake of brevity.

Summarizing the foregoing, the following drive transmission paths are established according to the gearshifting.

TABLE 1

| Gearshift Position | Drive Transmission Path |
|---|---|
| 1st Speed | Si → 1Gi → 1Gc → (Ya) → (Sc) → 4Gc → 4Go → So |
| 2nd Speed | Si → 2Gi → 2Gc → (Ya) → (Sc) → 4Gc → 4Go → So |

TABLE 1-continued

| Gearshift Position | Drive Transmission Path |
|---|---|
| 3rd Speed | Si → (Yb) → 3Gi → 3Gc → (Sc) → 4Gc → 4Go → So |
| 4th Speed | Si → (Yb) → So |
| 5th Speed | Si → 5Gi → 5Gc → (Yc) → (Sc) → 4Gc → 4Go → So |
| Reverse | Si → 6Gi → (Idler) → 6Gc → (Yc) → (So) → 4Gc → 4Go → So |

To demonstrate the effectiveness of the present invention, a series of experiments and simulation tests were conducted using the power transmission TM in which the various speed gear pairs 1G to 6G were so designed and so patterned as to have and establish the following respective gear ratios against the associated gearshift positions:

TABLE 2

| | Gearshift Positions | | | | | |
|---|---|---|---|---|---|---|
| | 1st-speed | 2nd-speed | 3rd-speed | 4th-speed | 5th-speed | Reverse |
| Gear Ratio | 3.717 | 2.202 | 1.497 | 1 | 0.791 | 3.402 |

For those specific gear ratios, the various gears on both of the shafts Si, Sc and So had the following number of gear teeth:

TABLE 3

| | Tooth Num. | | Tooth Num. |
|---|---|---|---|
| Gear 1Gi: | 16 | Countergear 1Gc: | 36 |
| Gear 2Gi: | 24 | Countergear 2Gc: | 32 |
| Gear 3Gi: | 32 | Countergear 3Gc: | 29 |
| Gear 4Go: | 23 | Countergear 4Gc: | 38 |
| Gear 5Gi: | 48 | Countergear 5Gc: | 23 |
| Gear 6Gi: | 17 | Countergear 6Gc: | 35 |
| | | Reverse Idler Gear: | 39 |

During the series of experiments and the simulation tests, the input reduction gear type having the same gear ratios as listed in Table 2 was employed for comparison purpose.

It is well known that the approximate lifetime of a gear is directly correlated with the stress σ which would be developed at the tooth root of the gear and the number N of revolution of the gear and the both have the following relationship:

$$\sigma^x \cdot N = \text{constant} \quad (1)$$

The tooth root stress σ is proportional to the transmission torque of the gear and, therefore, the approximate lifetime decreases in proportion to any one of the x-th power of the transmission torque and the rotational number N.

Considering that the power transmission embodying the present invention is the output reduction gear type in which at the time of transmission of the drive from the input shaft Si to the countershaft Sc, no number of revolution decrease (that is, no rotational torque of the input shaft Si is amplified), the lifetime of the speed gear pairs 1G to 3G and 5G except for the fourth speed gear pair 4G increases as compared with the conventional power transmission of the input reduction gear type in which speed gear pairs comprising fixed gears are disposed between the input shaft and the countershaft for rotation together therewith, respectively.

Accordingly, for a given lifetime, the present invention makes it possible to employ the various speed gears having a smaller diameter (diameter of the pitch circle) or thickness (tooth face width) than in the conventional power transmission. It is however to be noted that since the extent to which the thickness of each speed gear can be reduced is limited in view of clashing sounds generated by the gears, each speed gear was reduced in radial dimension for the purpose of the present invention to thereby reduce the spacing between the input shaft Si and the countershaft Sc which in turn brought about reduction in size of the power transmission TM as a whole.

As regards the fourth speed gear pair 4G, since the revolution of the countershaft Sc is transmitted to the output shaft So at a speed reduced (with the rotational torque increased) by the mating gears of the fourth speed gear pair 4G as hereinbefore discussed, the approximate lifetime of the fourth speed gear pair 4G tends to decrease as compared with that in the conventional power transmission. In view of this, in the illustrated embodiment a gear of a type having an increased face width was employed for each of the gears of the fourth speed gear pair 4G and, at the same time, shot peening conditions used for the surface hardening of each of the gears of the fourth speed gear pair 4G were improved, to thereby compensate for reduction in lifetime of the fourth speed gear pair 4G.

Apart from the above, the gearshifting force Fs during the gearshifting of the power transmission is known to be expressed by the following equation wherein Ig represents the inertia of the gear train, Ic represents the inertia of the clutch, Nd represents the difference in rotational speed (rpm), Tr represents the rotational resistance, Cs represents the synchro capacity and η represents the link efficiency:

$$Fs=[(Ig+Ic)\cdot Nd+Tr]/(Cs\cdot \eta) \quad (2)$$

Thus, the gearshifting force Fs tends to be considerably affected by the respective inertias Ig and Ic of the gear train and the clutch and, accordingly, if those inertias are reduced, the gearshifting force Fs can be reduced.

The following Table 4 illustrates results of calculation of the inertia exhibited when the various transmissions were set to the 2nd-speed gearshift position. In this Table 4, the inertia exhibited by the conventional input reduction gear type in which all of the speed synchronizers are disposed on the input shaft is given by a base reference of 100. Also, in Table 4, Comp. 1 represents a comparative model of the output reduction gear type in which all of the speed synchronizers are disposed on the input shaft; Comp. 2 represents another comparative model of the output reduction gear type in which only the 5-R speed synchronizer is disposed on the countershaft with the other speed synchronizers on the input shaft; and Comp. 3 represents a further comparative model of the output reduction gear type in which only the 1–2 speed synchronizer is disposed on the countershaft with the other speed synchronizers on the input shaft. In the power transmission TM of the present invention, the 1–2 and 5-R speed synchronizers Ya and Yc have been shown and described as disposed on the countershaft Sc with the other speed synchronizer Yb on the input shaft Si.

TABLE 4

| | Inertia | |
|---|---|---|
| Input speed gear type (Conventional) | All Synchronizers on Input Shaft | 100 |
| Output (Comp. 1) | All Synchronizers on Input Shaft | 28.8 |
| reduction (Comp. 2) | 5-R Synchronizer on Countershaft | 30.6 |
| gear type (Comp. 3) | 1-2 Synchronizer on Countershaft | 48.2 |
| (Embodiment) | 1-2 & 5-R Synchronizers on Countershaft | 51.4 |

The Table 4 makes it clear that when the power transmission is designed to be of the output reduction gear type, the inertia can be reduced considerably. This in turn brings about reduction in required gearshifting force and also reduction in synchro capacity of each of the speed synchronizer Ya to Yc as compared with that in the conventional power transmission. Reduction in synchro capacity may eventually lead to advantageous reduction in size of each speed synchronizer Ya to Yc.

Although considering the Table 4 discussed above, it appears advisable or recommendable to dispose all of the speed synchronizers Ya to Yc on the input shaft Si to accomplish further reduction of the inertia, the speed synchronizers Ya to Yc in the illustrated embodiment have been specifically arranged as shown in and described with reference to the drawings for the purpose of substantially eliminating problems associated with seizing as will now be discussed.

In the output reduction gear type, the number of revolution of the countershaft Sc varies depending on the gearshift position and will become higher than that of the input shaft Si at higher speed gearshift positions. This is in contrast to the conventional type in which the countershaft is driven at a rotational speed reduced in proportion to the number of revolutions of the input shaft.

Figure 5:
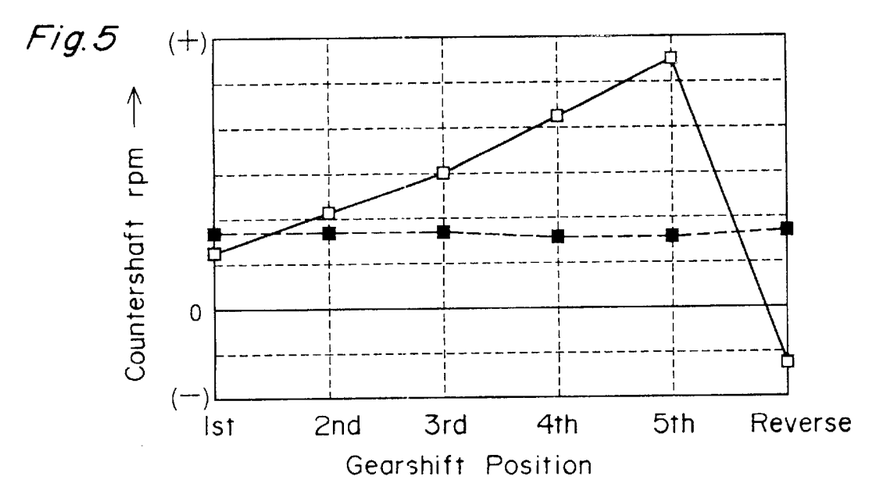
FIG. 5 is a graph showing the relationship between the gearshift position and the rotational speed of the countershaft.

FIG. 5 illustrates the graph showing a difference in rotational speed (rpm) of the countershaft between the output reduction gear type and the conventional type at each gearshift positions when the engine rotational speed remains the same. In this graph of FIG. 5, the curve shown by the solid line represents a change in rotational speed of the countershaft Sc in the output reduction gear type with change in gearshift position and the curve shown by the dotted line represents a change in rotational speed of the countershaft in the conventional type with change in gearshift position. As can readily be understood from FIG. 5, the output reduction gear type exhibits the rotational speed of the countershaft Sc that varies with change in gearshift position and that is considerably higher than that of the countershaft in the conventional type at higher speed gearshift positions. Moreover, at the reverse-drive gearshift position the countershaft Sc is driven at a higher speed than that in the conventional type, but in a direction reverse to that during any one of the 1st-speed to 5th-speed gearshift positions.

Assuming that all of the speed synchronizers are disposed on the input shaft such as in the conventional type, for example, the power transmission disclosed in EP 0 219 240-A1 referred to hereinbefore, all of the speed gears on the input shaft must be idler gears rotatable relative to the input shaft. Specifically, one of the speed gears forming any one of the first speed gear pair and the sixth speed gear pair (the reverse-drive gear pair), both having a higher gear ratio, which has a smaller gear diameter than that of the other of those speed gears must be an idler gear rotatable relative to the input shaft and, therefore, if the rotational speed of the countershaft increases as hereinabove discussed, the relative rotational speed of this idler gear relative to the input shaft during idle rotation thereof will become considerably high to such an extent as to result in undesirable problems associated with gear-to-shaft seizing. In the case of the reverse-drive gear freely rotatable on the input shaft, the reverse-drive gear is driven in a direction counter to the input shaft by the action of the reverse idler gear, exhibiting a considerable difference in relative rotational speed between it and the input shaft.

Because of the reason discussed above, in the illustrated embodiment of the present invention, the 5-R speed synchronizer Yb for selectively engaging one of the 5th-speed countergear 5Gc and the reverse-drive countergear 6Gc with the countershaft Sc and the 1–2 speed synchronizer Ya for selectively engaging one of the 1st-speed countergear 1Gc and the second-speed countergear 2Gc with the countershaft Sc are disposed on the countershaft Sc as hereinbefore described so that one of the speed gears of each of the sixth or reverse-drive gear pair 6G and the first gear pair 1G which has a smaller diameter than the other of those gears, that is, the reverse-drive or 1st-speed gear 6Gi or 1Gi, can be fixedly mounted on the input shaft Si for rotation together therewith. Accordingly, those gears 6Gi and 1Gi can be driven at a predetermined rotational speed equal to the rotational speed of the input shaft Si at all times.

On the other hand, the other of those speed gears of each gear pair 6G or 1G which has a greater diameter, that is, the reverse-drive or 1st-speed countergear 6Gc or 1Gc, is mounted on the countershaft Sc as an idler speed gear rotatable independent of the countershaft Sc and, therefore, exhibits a rotational speed lower relative to the countershaft Sc than that exhibited by the speed gear 6Gi or 1Gi. Accordingly, such a considerable difference in rotational speed as occurring when in the output reduction gear type the speed synchronizers Ya and Yc would be disposed on the input shaft Si does not occur between the input shaft Si and the idler speed gear of each of the reverse-drive gear pair 6G and the 1st-speed gear pair 1G.

However, since in the output reduction gear type the rotational speed of the countershaft Sc is extremely high at higher speed gearshift positions as discussed above, the idler speed gears 1Gc, 2Gc, 5Gc and 6Gc all mounted on the countershaft Sc for rotation independent thereof have their associated bearings which are placed in a difficult lubricating condition during their idle rotation.

To facilitate lubrication of those bearings, as shown in FIG. 1, the input-side bulkhead 11 positioned foremost of the transmission casing 10 is formed with an oil passage 16 defined therein so as to extend completely across the wall defining the input-side bulkhead 11. This oil passage 16 has a front end opening into an oil reservoir 17 delimited between the input-side bulkhead 11 and the front cover 15. It is to be noted that a bearing opening in the front cover 15 through which the input shaft Si rotatably extends is fluid-tightly closed by a sealing member 15s mounted to a peripheral lip region of the cover plate 15 around the bearing opening. The oil passage 16 also has a rear end opposite to the front end which opens into the interior of the transmission casing 10. Although not shown specifically, a generally trough-shaped oil path inclined forwardly is defined at a location above the fifth gear pair and the sixth or reverse-drive gear pair 6G, with its front end positioned immediately above the rear end of the oil passage 16.

The countershaft Sc has an axial oil passage Lc defined therein so as to extend in a direction coaxially of the countershaft Sc. This axial oil passage Lc has a plurality of radial branches extending radially outwardly therefrom towards the respective bearings for the idler speed gears 1Gc, 2Gc, 5Gc and 6Gc on the countershaft Sc.

The oiling system described above is so designed and so configured that lubricant oil within the oil reservoir 17 which is stirred upwardly by some of the idler speed gears, then driven together with the countershaft Sc, collides against the interior wall of the transmission casing 10 and which subsequently falls by gravity along the interior wall of the transmission casing 10 can, after having been collected into the trough-shaped oil path, be guided efficiently into the axial oil passage Lc through the oil passage 16 and then through the oil reservoir 17 to thereby oil the respective bearings for the idler speed gears 1Gc, 2Gc, 5Gc and 6Gc.

As is the case with the conventional manual power transmission, even the power transmission TM embodying the present invention has a quantity of lubricant oil accommodated within the bottom of the transmission casing 10 to a predetermined level shown by the linear phantom line in FIG. 1. Supply of the lubricant oil to respective meshing regions of the gears of the various gear pairs 1G to 6G, the associated bearings for the idler speed gears 1Gi to 1G3, 5Gi and 6Gi on the input shaft Si and/or any other portions that require oiling is carried out by stirring it upwardly by means of some of the countergears on the counter shaft Sc then driven together with the latter. Most of the lubricant oil so stirred upwardly collides against the interior wall of the transmission casing 10 and subsequently falls by gravity along the interior wall of the transmission casing 10 and is cooled in contact with the interior wall of the transmission casing 10 before it is again supplied to the regions, bearings and/or portions that require oiling.

It is to be noted that the level of the lubricant oil within the transmission casing 10 which has been described as shown by the linear phantom line in FIG. 1 lies at a position somewhat higher than the level shown by the linear phantom line and, specifically, at a position in the vicinity of the longitudinal axis of the countershaft Sc so long as the automotive engine is held still or has not yet been driven. However, once the automotive engine is driven, the level of the lubricant oil within the transmission casing 10 lowers down to the position shown by the linear phantom line in FIG. 1 as the lubricant oil is stirred upwardly as described hereinbefore.

It is also to be noted that since in the present invention the countershaft Sc may be driven at a high speed as hereinbefore discussed, the amount of the lubricant oil within the transmission casing 10 cannot be increased to a value as much as the lubricant oil employed in the conventional power transmission. The reason therefor will now be described.

Figure 6:
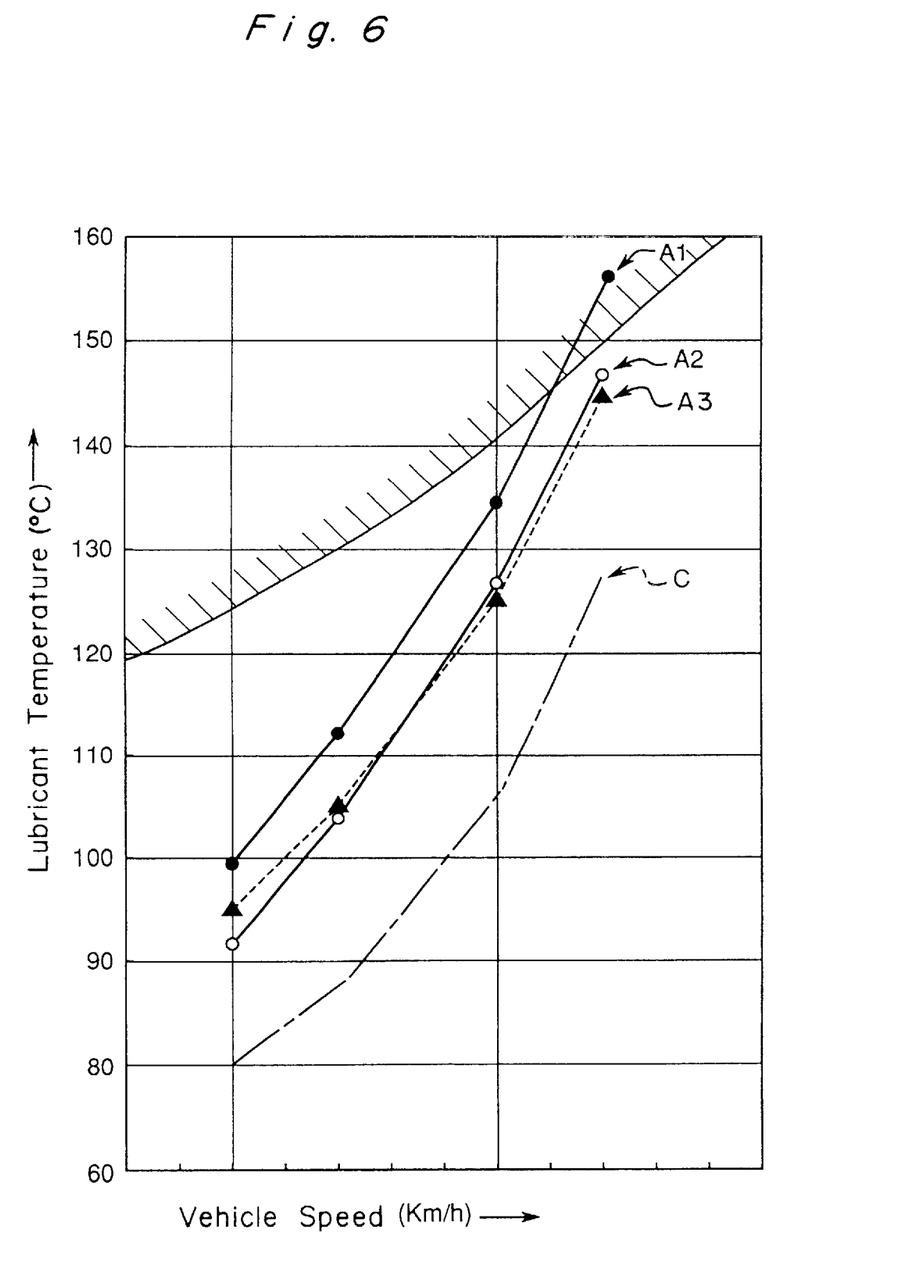
FIG. 6 is a graph showing the relationship between the vehicle speed and the temperature of a lubricant oil accommodated within the power transmission.

FIG. 6 illustrates a graph descriptive of change in temperature of the lubricant oil with change in vehicle speed when the power transmission TM is set in the 5th-speed gearshift position at which the rotational speed of the countershaft Sc attains the highest value.

In the graph of FIG. 6, a curve indicated by A1 illustrates the change of the lubricant temperature exhibited by the output reduction gear type in which the lubricant oil substantially equal in amount to that employed in the conventional power transmission was employed; a curve indicated by A2 illustrates the change of the lubricant temperature exhibited by the output reduction gear type in which the lubricant oil smaller in amount than that employed in the conventional power transmission was employed; and a curve indicated by A3 illustrates the change of the lubricant temperature exhibited by the input reduction gear type (i.e., the type in which the rotational speed of the countershaft is fixed regardless of the gearshift position and proportional to the input rotational speed) in which the lubricant oil substantially equal in amount to that employed in the conventional power transmission was employed.

Also in the graph of FIG. 6, a curve shown by C represents change in calculated value of the lubricant temperature with vehicle speed which occurred only when a loss of torque resulting from gear engagement was take into consideration and was calculated according to the following equation (3) using both the lubricant temperature data (shown in FIG. 6) on an actual vehicle and actually measured data of the stirring resistance (as will subsequently be discussed with reference to FIG. 7).

Figure 7:
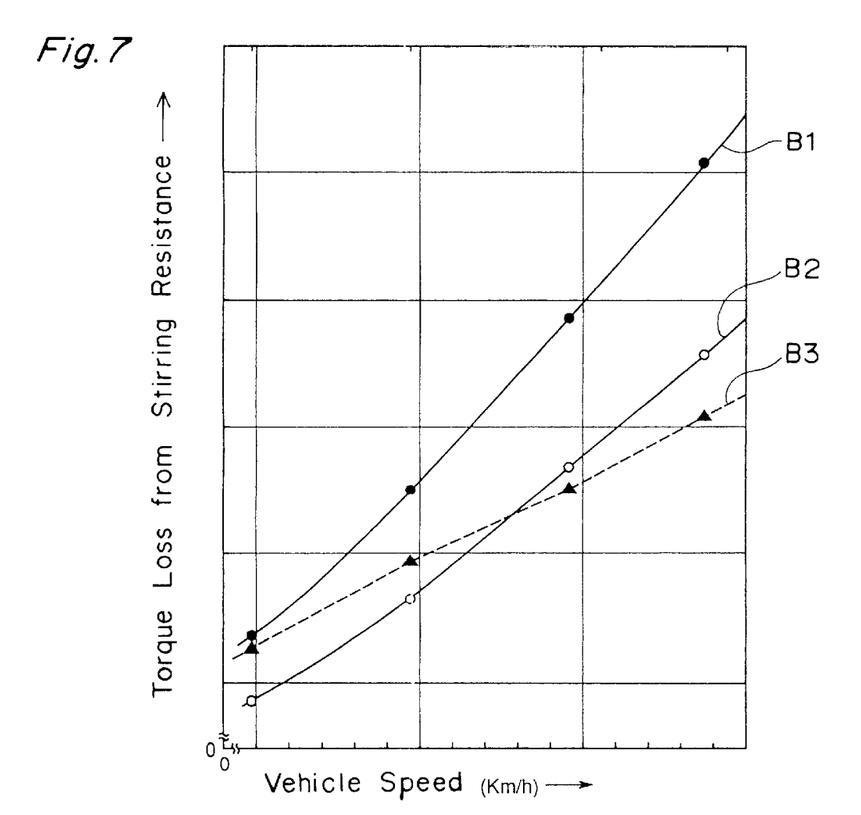
FIG. 7 is a graph showing the relationship between the vehicle speed and a loss of torque resulting from a stirring resistance.

Referring now to FIG. 7, there is shown a graph illustrating a change of a loss of torque resulting from the stirring resistance relative to the vehicle speed and the rotational speed of the input shaft. In this graph, curves indicated by Bi, B2 and B3 were exhibited by the power transmissions which gave rise to the curves A1, A2 and A3 shown in FIG. 6, respectively.

Considering the equations which are used to calculate the exotherm per unitary time and the heat release value per unitary time, the following equation (3) can be obtained as an equation descriptive of the thermal equilibrium at a stabilized lubricant temperature. As discussed hereinbefore, the curve C shown in the graph of FIG. 6 was based on results of calculation carried out by the use of the equation (3).

$$T_D \cdot 2\pi \cdot N/60 = K \cdot (T_1 - T_2) \qquad (3)$$

wherein $T_D$ represents the sum of the loss of torque resulting from the gear engagement and the loss of torque resulting from the stirring resistance; N represents the input rotational speed; K represents a coefficient of heat release which is fixed according to the shape of the appearance of the power transmission and the flow of a cooling air and which is affected by the extent to which the lubricant oil can be stirred up by some of the countergears during rotation of the countershaft; $T_1$ represents the temperature of the lubricant oil; and $T_2$ represents the ambient temperature.

From the foregoing, it has now become clear that in the case of the output reduction gear type it is preferred to reduce the amount of the lubricant oil employed in the power transmission in order to suppress the increase of the lubricant temperature. It is to be noted that suppression of the increase of the stirring resistance of the lubricant oil resulting from reduction in quantity of the lubricant oil that can be used in the output reduction gear type is effective to suppress any possible reduction in power transmission efficiency.

Figure 3:
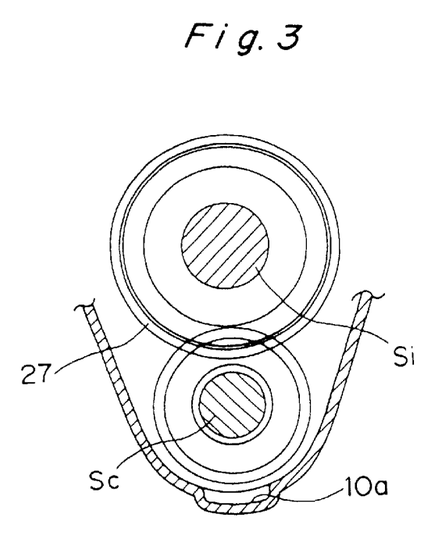
FIG. 3 is a cross-sectional view taken along the line III—III in FIG. 1.
Figure 4:
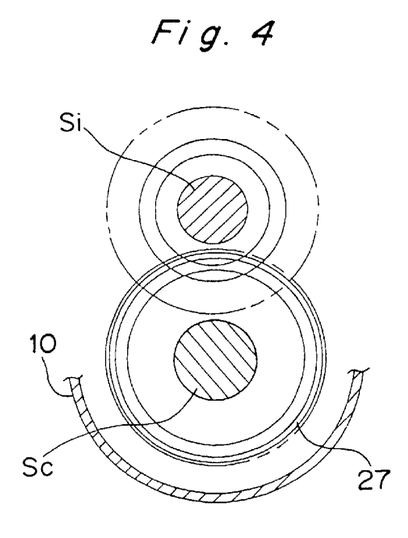
FIG. 4 is a cross-sectional view taken along the line IV—IV in FIG. 1.

Referring to FIGS. 3 and 4, in order to avoid any possible outward protrusion of a bottom region of the transmission casing 10 so that the power transmission TM as a result can be assembled compact, that bottom region of the transmission casing 10 is so shaped and so configured as to represent an outwardly curved sectional shape conforming to the curvature of the contour of any one of the countergears on the countershaft Sc. In addition, a downwardly recessed oil path 10a is formed between a portion of the oil reservoir aligned with any one of the countergears 5Gc, 6Gc, 1Gc, 2Gc and 3Gc and a portion of the oil reservoir aligned with the output countergear 4Gc to thereby establish a smooth communication therebetween.

It is to be noted that when the automotive vehicle is abruptly accelerated or decelerated or runs along the slope, the level of the lubricant oil accommodated below the countershaft Sc within the transmission casing 10 inclines relative to the transmission casing 10, as shown by the single-dotted chain lines in FIG. 1, to such an extent that one of the countergears mounted adjacent an extremity of the countershaft Sc will no longer be able to stir the lubricant oil upwardly, but the lubricant oil will be stirred up by some of the countergears mounted on a generally intermediate portion of the countershaft Sc. In such case, if such some of the countergears on the generally intermediate portion of the countershaft Sc have a relatively small size or diameter, the amount of the lubricant oil stirred up will become short of the requirement and all necessary portions where require oiling will not be oiled sufficiently.

To avoid the problem discussed immediately above, in accordance with the illustrated embodiment, some of the countergears which have a relatively large size or diameter are positioned on the generally intermediate portion of the countershaft Sc. More specifically, as shown in FIG. 1, the countergears 1Gc, 2Gc, 5Gc and 6Gc were arranged on the countershaft Sc in this specific order from the input side to the output side of the power transmission TM. In other words, of the three speed gear units, the 1–2 speed gear unit is positioned at a generally intermediate portion of the row of the countergears and, of the six gear pairs 1G to 6G, the gear pairs are arranged in the order of 5G, 6G, 1G, 2G, 3G and 4G from the input side to the output side of the power transmission TM. In terms of the countergears, the 1st-speed countergear 1Gc having the highest gear ratio is positioned intermediate of the row of the countergears and the 5th-speed countergear 5Gc is positioned adjacent the input-side end of the countershaft, with the reverse-drive countergear 6Gc having the next highest gear ratio positioned therebetween.

With the countergears 1Gc to 6Gc arranged on the countershaft Sc in the manner described above, it will readily be understood that a line of envelope depicted so as to touch respective teeth of the countergears which are oriented downwardly and confront the bottom wall of the transmission casing 10 represents a smooth curve having a generally intermediate segment separated furthest from the countershaft Sc as shown by the phantom line Lh in FIG. 2.

Accordingly, even when the automotive vehicle is abruptly accelerated or decelerated or runs along the slope with the level of the lubricant oil within the transmission casing 10 inclined relative to the transmission casing 10 as shown by the single-dotted chain lines in FIG. 2 to such an extent that one of the countergears mounted adjacent an extremity of the countershaft Sc will no longer be able to stir the lubricant oil upwardly, the lubricant oil can be effectively stirred up by some of the countergears arranged at the generally intermediate position of the row of the countergears, that is, the countergears 1Gc, 2Gc and 6Gc, to thereby oil all necessary portions satisfactorily. Thus, according to the present invention, even when the amount of the lubricant oil employed is relatively small, a sufficient amount of the lubricant oil to be stirred up can be effectively secured even if the level of the lubricant oil within the transmission casing 10 is inclined in the manner discussed above.

In particular, since the 1st-speed gear 1Gi having the greatest radial size and the 2nd-speed countergear 2Gc having the third greatest radial size, both forming parts of the 1–2 speed gear unit, are positioned intermediate of the row of the countergears on the countershaft Sc, and the reverse-drive countergear 6Gc having the second greatest radial size is positioned next to the 1st-speed countergear 1Gc, with the 1st-speed countergear 1Gc positioned intermediate of the row of the freely rotatably mounted countergears, the lubricant oil within the transmission casing 10 can be effectively and satisfactorily stirred up during rotation of some of the countergears then driven together with the countershaft Sc regardless of the level of the lubricant oil, that is, regardless of whether the automotive vehicle is abruptly accelerated or decelerated or whether the automotive vehicle runs along the slope.

Figure 8:
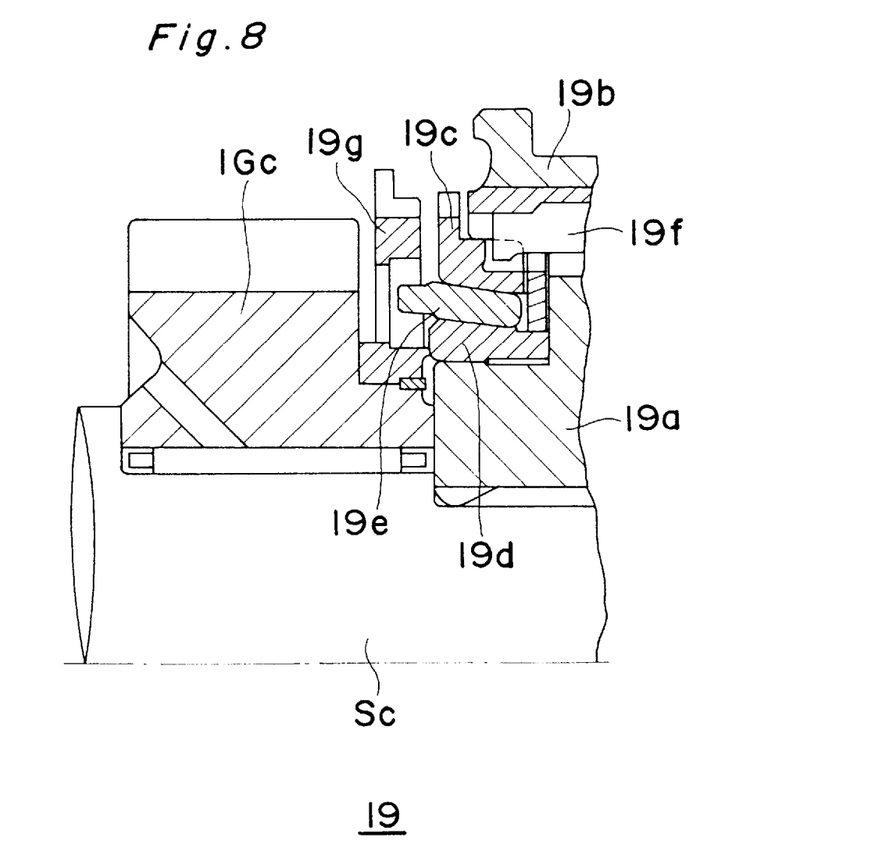
FIG. 8 is a view similar to FIG. 2, showing a modified form of the speed synchronizer.

Referring to FIG. 8, there is shown an important portion of the speed synchronizer of a so-called double-cone type that is so designed as to substantially eliminate the necessity of the varying gearshifting force depending on the gearshift position so that a substantially uniform gearshifting force can be applicable regardless of change in viscosity of the lubricant oil within the transmission casing. While the speed synchronizers employed in the foregoing embodiment are of the single-cone type, some or all of the speed synchronizer may be replaced with double-cone type speed synchronizers. As compared with the single-cone type speed synchronizer, the double-cone type speed synchronizer is advantageous in that no relatively large force is required during a gearshifting maneuver, that is, a relatively high synchronizing capacity can be obtained. However, in another preferred embodiment of the present invention, by the reason hereinbefore discussed, the double-cone type speed synchronizer is employed only in first and second speed drive, that is, around the countershaft Sc between the 1st-speed countergear 1Gc and the 2nd-speed countergear 2Gc.

The details of the double-cone type speed synchronizer will now be described with particular reference to FIG. 8 in which only one of mutually symmetrical portions of the double-cone type speed synchronizer which confronts the 1stspeed countergear 1Gc is shown in section. As shown therein, the double-cone type speed synchronizer includes a synchronizer hub 19a splined to the countershaft Sc, an axially slidable sleeve 19b mounted around and splined to the synchronizer hub 19a and adapted to be axially displaced in one of the opposite directions counter to each other in a direction axially of the countershaft Sc in response to movement of a shifter fork (not shown in FIG. 8, but shown by 30 in FIG. 2) linked with the gearshift lever, a plurality of synchronizer keys 19f mounted around the synchronizer hub 19a and drivingly accommodated within an annular groove delimited between the synchronizer hub 19a and the sleeve 19b, outer cones (synchronizer rings) 19c each having its radially inner surface shaped to represent the shape of a cone, inner cones 19d joined to the synchronizer hub 19a and having a radially outer surface shaped to represent the shape of a cone of at an angle complemental to the angle of cone represented by the radially inner surface of the outer cones 19c, and intermediate cone (synchronizing cones) 19e each capable of being drivingly connected with the countergear 1Gc or 2Gc through a respective synchronizeable gear 19g and sandwiched frictionally between the adjacent inner and outer cones 19d and 19c for transmitting a drive from the synchronizer hub 19a to the associated gear 19b and then to the countergear 1Gc or 2Gc. In this double-cone type speed synchronizer, the surface area of engagement between the outer cones 19c and the synchronizer hub 19a is so large that the relatively high synchronizing capacity can be obtained.

Even with the double-cone type speed synchronizer, depending on the direction in which the synchronizer sleeve is moved according to the gearshifting, one of the gears on respective sides of the speed synchronizer can be locked to and driven together with the shaft on which those gears are mounted.

Although the present invention has been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A power transmission having a plurality of gear ratios, said power transmission comprising:

a transmission casing having input and output end walls opposite to each other and also having an oil reservoir defined at bottom thereof;

an input shaft having first and second ends opposite to each other and rotatably supported by the input end wall of the casing with the first and second ends thereof positioned inside and outside of the casing, respectively;

an output shaft having first and second ends opposite to each other and rotatably supported by the output end wall of the casing with the first and second ends thereof positioned inside and outside of the casing, respectively, said input and output shafts being coaxially aligned with each other;

a countershaft having first and second ends opposite to each other and disposed within the casing and below the input and output shafts so as to extend parallel to anyone of the input and output shafts;

a plurality of speed gear pairs associated respectively with the gear ratios, said speed gear pairs including:

speed gears mounted on the input shaft, at least one of which is mounted on the input shaft for rotation independent of the input shaft, the remaining speed gears being mounted on the input shaft for rotation together with the input shaft, a speed-reducing driven gear mounted on the output shaft for rotation together therewith, and countergears mounted on the countershaft at respective locations corresponding to the speed gears, some of said countergears serving as speed-changing countergears, said speed-changing countergears being mounted on a portion of the countershaft that is radially outwardly of and encompassed by a portion of the input shaft within the transmission casing, at least one of said speed-changing countergears being mounted on the countershaft for rotation together therewith and positioned at a location corresponding to said at least one of the speed gears, the remaining countergears being positioned at respective locations corresponding to said remaining speed gears and serving as idle countergears rotatable independent thereof, another one of said countergears which is mounted on the countershaft for rotation together therewith and positioned at a location radially outwardly of and encompassed by a portion of the output shaft within the transmission casing, serving as a speed-reducing drive gear, said speed-reducing drive gear having a diameter smaller than the speed-reducing driven gear and being meshed with said speed-reducing driven gear to define one of the speed gear pairs which is a reduction gear pair, and said speed gears and said countergears being paired with each other to define the respective speed gear pairs associated respectively with gearshift positions;

a gear change mechanism for changing a path of transmission of a drive from the input shaft to the output shaft directly without being routed through the reduction gear pair or through the countershaft by way of a selected one of the gear pairs, said gear change mechanism including a plurality of speed synchronizers, one of said speed synchronizers being mounted around the input shaft for drivingly coupling the input shaft with the output shaft and also for drivingly coupling said at least one of the speed gears with the input shaft the remaining speed synchronizers being mounted around the countershaft and each operable to drivingly couple a selected one of two of the idler counters on respective sides of the speed synchronizer with the countershaft to permit such selected idler countergear to rotate together with the countershaft;

said speed-changing countergears having respective gear diameters that are different from each other, the gear diameters of all of said speed-changing countergears except for the speed-reducing drive gear being sequenced axially of the countershaft between the first and second ends thereof to depict a generally barrel-shaped envelope having a longitudinal axis concentric with the countershaft and also having a maximum diameter of which position is occupied substantially by the speed-changing countergear of the largest gear diameter.

2. The power transmission as claimed in claim 1, further comprising a first bearing through which the second end of the input shaft remote from the output shaft is rotatably supported by the transmission casing, and a second bearing through which the first end of the countershaft immediately below the input shaft is rotatably supported by the transmission casing, said first and second being having a type different from each other.

3. The power transmission as claimed in claim 2, wherein said second bearing has a capacity of bearing a radial load which is higher than that exhibited by the first bearing.

4. The power transmission as claimed in claim 2, wherein said first being is a ball bearing and said second bearing is a roller bearing.

5. The power transmission as claimed in claim 2, further comprising a tapered-roller bearing through which the second end of the countershaft is rotatably supported by the transmission casing, said tapered-roller bearing having a bearing face tapered in a direction axially of the countershaft.

6. The power transmission as claimed in claim 1, further comprising a first bearing through which the second end of the input shaft remote from the output shaft is rotatably supported by the transmission casing, and second and third bearings through which the first end of the output shaft is rotatably supported by the transmission casing, said second and third bearings being positioned on respective sides of said speed-reducing driven gear, and further comprising a fourth bearing through which the first end of the countershaft immediately below the input shaft is rotatably supported by the transmission casing, and fifth and sixth bearings through which the second end of the countershaft is rotatably supported by the transmission casing, said fifth and sixth bearing being positioned on respective sides of said speed-reducing drive gear, each of said second, third, fifth and sixth bearing being a tapered-roller bearing having a bearing face tapered in a direction axially of the shafts.

7. The power transmission as claimed in claim 6, wherein each of said second and third bearings has an outwardly flared and confronting the speed-reducing driven gear and each of said fifth and sixth bearing has an outwardly flared end confronting the speed-reducing drive gear.

8. The power transmission as claimed in claim 1, wherein one of the speed synchronizers employed for a low speed drive has a synchronizing capacity larger than that of the remaining speed synchronizers.

9. The power transmission as claimed in claim 8, wherein said one of the speed synchronizers is a double-cone type speed synchronizer whereas the remaining speed synchronizers are a single-cone type speed synchronizer.

10. The power transmission as claimed in claim 9, wherein the double-cone type speed synchronizer is used to select one of first and second speed drives.

11. A power transmission having a plurality of gear ratios, said power transmission comprising:

a transmission casing having input and output end walls opposite to each other and also having an oil reservoir defined at bottom thereof;

an input shaft having first and second ends opposite to each other and rotatably supported by the input end wall of the casing with the first and second ends thereof positioned inside and outside of the casing, respectively;

an output shaft having first and second ends opposite to each other and rotatably supported by the output end wall of the casing with the first and second ends thereof positioned inside and outside of the casing, respectively, said input and output shafts being coaxially aligned with each other;

a countershaft having first and second ends opposite to each other and disposed within the casing and below the input and output shafts so as to extend parallel to any one of the input and output shafts;

a plurality of speed gear pairs associated respectively with the gear ratios corresponding to at least first-speed, second-speed, third speed fourth speed, fifth-speed and reverse-drive gearshift positions, said speed gear pairs including:

speed gears mounted on the input shaft, at least one of which is mounted on the input shaft for rotation independent of the input shaft, the remaining speed gears being mounted on the input shaft for rotation together with the input shaft, a speed-reducing driven gear mounted on the output shaft for rotation together therewith, and countergears mounted on the countershaft at respective locations corresponding to the speed gears, some of said countergears serving as speed-changing countergears that are mounted on a portion of the countershaft which is radially outwardly of an encompassed by a portion of the input shaft within the transmission casing, at least one of the speed-changing countergears being mounted on the countershaft for rotation together therewith and positioned at a location corresponding to said at least one of the speed gears, the remaining countergears being positioned at respective locations corresponding to said remaining speed gears and serving as idle countergears rotatable independent thereof, another one of said countergears which is mounted on the countershaft for rotation together therewith and positioned at a location radially outwardly and encompassed by a portion of the output shaft within the casing, serving as a speed-reducing drive gear, said speed-reducing drive gear having a diameter smaller than the speed-reducing driven gear and being meshed with said speed-reducing driven gear to define one of the speed gear pairs which is a reduction gear pair, and said speed gears and said countergears being paired with each other to define the respective speed gear pairs associated respectively with the gearshift positions;

a gear change mechanism for changing a path of transmission of a drive from the input shaft to the output shaft directly without being routed through the reduction gear pair or through the countershaft by way of a selected one of the gear pairs, said gear change mechanism including a plurality of speed synchronizers, one of said speed synchronizers being mounted around the input shaft for drivingly coupling the input shaft with the output shaft to complete a transmission path associated with the third-speed gearshift position and also for drivingly coupling said at least one of the speed gears with the input shaft to complete a transmission path associated with the fourth-speed gearshift position the remaining speed synchronizer being mounted around the countershaft and each operable to drivingly couple a selected one of two of the idler countergears on respective sides of the speed synchronizer with the countershaft to permit such selected idler countergear to rotate together with the countershaft;

said speed-changing countergears having respective gear diameters that are different from each other, the gear diameters of all of said speed-changing countergears except for the speed-reducing drive gear being juxtaposed on the countershaft in a sequence axially of the countershaft such that between the first and second ends of the countershaft, the respective diameters of the speed-changing countergears form a generally barrel-shaped envelope having a longitudinal axis concentric with the countershaft, the speed-changing countergear of the largest gear diameter being positioned at a location enclosed within and corresponding to a maximum diameter of the barrel-shaped envelope.

12. The power transmission as claimed in claim 11, wherein one of the speed gear pairs which is associated with the first-speed gearshift position and another one of the speed gear pairs which is associated with the second-speed gearshift position are positioned generally intermediate of the speed changing countergears and wherein one of the speed-changing countergears associated with the reverse-drive gearshift position and another one of the speed-changing countergears associated with the fifth-speed gearshift position are positioned on one side of the speed-changing countergears associated respectively with the first-speed and second-speed gearshift positions adjacent an input side of the transmission casing, the speed-changing countergear associated with the fifth-speed gearshift position being positioned on one side of the countershaft remote from the speed-changing countergear associated with the reverse-drive gearshift position and adjacent the first end of the countershaft.

13. The power transmission as claimed in claim 11, wherein one of the speed-changing countergears associated with the first-speed gearshift position is positioned intermediate of all the remaining countergears.

14. The power transmission as claimed in claim 11, wherein one of the speed synchronizers employed for a low speed drive has a synchronizing capacity larger than that of the remaining speed synchronizers.

15. The power transmission as claimed in claim 14, wherein said one of the speed synchronizers is a double-cone type speed synchronizer whereas the remaining speed synchronizers are a single-cone type speed synchronizer.

16. The power transmission as claimed in claim 15, wherein the double-cone type speed synchronizer is used to select one of first and second speed drives.

17. A power transmission having a plurality of gear ratios, said power transmission comprising:

a transmission casing having input and output end walls opposite to each other and also having an oil reservoir defined at bottom thereof;

an input shaft having first and second ends opposite to each other and rotatably supported by the input end wall of the casing with the first and second ends thereof positioned inside and outside of the casing, respectively;

an output shaft having first and second ends opposite to each other and rotatably supported by the output end wall of the casing with the first and second ends thereof positioned inside and outside of the casing, respectively, said input and output shafts being coaxially aligned with each other;

a countershaft having first and second ends opposite to each other and disposed within the casing and below the input and output shafts so as to extend parallel to any one of the input and output shafts;

a plurality of speed gears pairs having respective predetermined gear ratios associated respectively with the gear ratios corresponding to at least first-speed, second-speed, third-speed, fourth-speed, fifth-speed and reverse-drive gearshift positions, said speed gear pairs including:

speed gears mounted on the input shaft, at least one of said speed gears being mounted on the input shaft for rotation independent of the input shaft, the remaining speed gears being mounted on the input shaft for rotation together with the input shaft, a speed-reducing driven gear mounted on the output shaft for rotation together therewith, and countergears mounted on the countershaft at respective locations corresponding to the speed-gears, some of said countergears serving as speed-changing countergears that are mounted on an portion of the countershaft which is radially outwardly of an encompassed by a portion of the input shaft within the transmission casing at least one of said speed-changing countergears being mounted on the countershaft for rotation together therewith and positioned at a location corresponding to said at least one of the speed gears, the remaining countergears being positioned at respective locations corresponding to said remaining speed gears, said remaining countergears serving as idle countergears rotatable independent thereof, another one of said countergears which is mounted on the countershaft for rotation together therewith and positioned at a location radially outwardly of and encompassed by a portion of the output shaft within the transmission casing, serving as a speed reducing drive gear, said speed reducing drive gear having a diameter smaller than the speed-reducing driven gear and being meshed with said-reducing driven gear to define of the speed gear pairs which is a reduction gear pair, and said speed gears and said countergears being paired with each other to define the respective speed gear pairs associated respectively with the gearshift positions;

a gear change mechanism for changing a path of transmission of a drive from the input shaft to the output shaft directly without being routed through the reduction gear pair or through the countershaft by way of a selected one of the gear pairs, and gear change mechanism including a plurality of speed synchronizers, one of said speed synchronizers being synchronizers mounted around the input shaft for drivingly coupling the input shaft with the output shaft and also for drivingly coupling said at least one of the speed gears with the input shaft, the remaining speed synchronizers being mounted around the countershaft and each operable to drivingly couple a selected one of two of the idler countergears on respective sides of the speed synchronizer with the countershaft to permit such selected idler countergear to rotate together with the countershaft;

said speed-changing countergears having a diameter different from each other and being juxtaposed on the countershaft in the order of, as viewed from an input side of the transmission casing, the countergear associated with the fifth-speed gearshift position, the countergear associated with the reverse-drive gearshift position, the countergear associated with the first-speed gearshift position, the countergear associated with the second-speed gearshift position, and the countergear associated with the third speed gearshift position, and said countergear associated with the reverse-drive gearshift position having a diameter larger than that of the countergear associated with the fifth-speed gearshift position, said countergear associated with the first-speed gearshift position having a diameter larger than that of the countergear associated with the reverse-drive gearshift position, said countergear associated with the second-speed gearshift position having a diameter smaller than that of the countergear associated with the first-speed gearshift position, and said countergear associated with the third-speed gearshift position having a diameter smaller than that of the countergear associated with the second-speed gearshift position.

18. The power transmission as claimed in claim 17, wherein one of the speed gear pairs which is associated with the first-speed gearshift position and another one of the speed gear pairs which is associated with the second-speed gearshift position are positioned generally intermediate of the speed-changing countergears and wherein one of the speed-changing countergears associated with a reverse-drive gearshift position and another one of the speed-changing countergears associated with the fifth-speed gearshift position are positioned on one side of the speed-changing countergears associated respectively with the first-speed and second-speed gearshift positions adjacent an input side of the transmission casing, the speed-changing countergear associated with the fifth-speed gearshift position being positioned on one side of the countershaft remote from the speed-changing countergear associated with the reverse-drive gearshift position.

19. The power transmission as claimed in claim 17, wherein one of the speed-changing countergears associated with the first-speed gearshift position is positioned intermediate of all the remaining countergears.

20. The power transmission as claimed in claim 17, further comprising a first bearing through which the second end of the input shaft remote from the output shaft is rotatably supported by the transmission casing, and a second bearing through which the first end of the countershaft immediately below the input shaft is rotatably supported by the transmission casing, said first and second bearing having a type different from each other.

21. The power transmission as claimed in claim 20, wherein said second bearing has a capacity of bearing a radial load which is higher than that exhibited by the first bearing.

22. The power transmission as claimed in claim 20, wherein said first bearing is a ball bearing and said second bearing is a roller bearing.

23. The power transmission as claimed in claim 17, further comprising a tapered-roller bearing through which the second end of the countershaft is rotatably supported by the transmission casing, said tapered-roller bearing having a bearing face tapered in a direction axially of the countershaft.

24. The power transmission as claimed in claim 17, further comprising a first bearing through which the second end of the input shaft remote from the output shaft is rotatably supported by the transmission casing, and second and third bearings through which the first end of the output shaft is rotatably supported by the transmission casing, said second and third bearing being position on respective sides of said speed-reducing driven gear, and further comprising a fourth bearing through which the first end of the countershaft immediately below the input shaft is rotatably supported by the transmission casing, and fifth and sixth bearings through which the second end of the countershaft is rotatably supported by the transmission casing, said fifth and sixth bearing positioned on respective sides of said speed-reducing drive gear, each of the said second, third, fifth and sixth bearing being a tapered-roller bearing having a bearing face tapered in a direction axially of the shafts.

25. The power transmission as claimed in claim 24, wherein each of said second and third bearings has an outwardly flared end confronting the speed gear and each of said fifth and sixth bearing has an outwardly flared end confronting the countergear.

26. The power transmission as claimed in claim 17, wherein one of the speed synchronizers employed for a low speed drive has a synchronizing capacity larger than that of the remaining speed synchronizers.

27. The power transmission as claimed in claim 26, wherein said one of the speed synchronizers is a double-cone type speed synchronizer whereas the remaining speed synchronizers are a single-cone type speed synchronizer.

28. The power transmission as claimed in claim 27, wherein the double-cone type speed synchronizer is used to select one of first and second speed drives.

29. The power transmission as claimed in claim 1, wherein the number of the speed-changing countergears encompassed within the envelope is at least five.

30. The power transmission as claimed in claim 11, wherein the number of the speed-changing countergears encompassed within the envelope is at least five.

* * * * *